(12) United States Patent
Sung

(10) Patent No.: US 7,895,414 B2
(45) Date of Patent: Feb. 22, 2011

(54) INSTRUCTION LENGTH DETERMINATION DEVICE AND METHOD USING CONCATENATE BITS TO DETERMINE AN INSTRUCTION LENGTH IN A MULTI-MODE PROCESSOR

(75) Inventor: Lian Sung, Dongshih Township, Taichung County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 443 days.

(21) Appl. No.: 12/222,887

(22) Filed: Aug. 19, 2008

(65) Prior Publication Data

US 2009/0055629 A1     Feb. 26, 2009

(30) Foreign Application Priority Data

Aug. 20, 2007   (TW) .............................. 96130683 A

(51) Int. Cl.
*G06F 9/38* (2006.01)
(52) U.S. Cl. ....................... 712/210; 712/208
(58) Field of Classification Search ........................ None
See application file for complete search history.

(56) References Cited

U.S. PATENT DOCUMENTS

| | | | |
|---|---|---|---|
| 5,465,377 A * | 11/1995 | Blaner et al. ................... | 712/23 |
| 5,475,853 A * | 12/1995 | Blaner et al. .................. | 712/213 |
| 5,504,932 A * | 4/1996 | Vassiliadis et al. .......... | 712/208 |
| 5,732,234 A * | 3/1998 | Vassiliadis et al. .......... | 712/200 |
| 5,758,115 A | 5/1998 | Nevill | |
| 6,170,050 B1 * | 1/2001 | Koppala et al. .............. | 712/210 |
| 6,209,079 B1 | 3/2001 | Otani et al. | |
| 6,944,749 B2 * | 9/2005 | Ku ............................... | 712/210 |
| 7,039,791 B2 * | 5/2006 | Sachs et al. ................... | 712/215 |
| 7,149,879 B2 | 12/2006 | Liang | |
| 2006/0242387 A1 * | 10/2006 | Heishi et al. ................. | 712/226 |

* cited by examiner

*Primary Examiner*—Eric Coleman
(74) *Attorney, Agent, or Firm*—Bacon & Thomas, PLLC

(57) ABSTRACT

An instruction length determination device includes an instruction input unit having a memory space to store a plurality of N-bit data; an instruction fetch unit which fetches the plurality of N-bit data from the instruction input unit; an instruction length determination logic which compares concatenate bits of a first N-bit data with a predetermined value for determination of an instruction length; and an instruction concatenate unit which selectively concatenates a number of successive N-bit data based on the determination. The instruction length determination logic determines that the first N-bit data is a complete instruction when the concatenate bit of the first N-bit data is not equal to the predetermined value. Otherwise, the instruction length determination logic determines that a complete instruction is formed of last N-bit data finally fetched and all N-bit previously reserved.

11 Claims, 3 Drawing Sheets

INSTRUCTION LENGTH DETERMINATION DEVICE AND METHOD USING CONCATENATE BITS TO DETERMINE AN INSTRUCTION LENGTH IN A MULTI-MODE PROCESSOR

BACKGROUND OF THE INVENTION

1. Field of the Invention

The present invention relates to a technical field of processors and, more particularly, to an instruction length determination device and method using concatenate bits to determine an instruction length in a multi-mode processor.

2. Description of Related Art

A multi-mode processor switches between 2N-bit and N-bit instruction modes in order to reduce the space required for storing programming codes typically.

In U.S. Pat. No. 7,149,879 granted to Liang for a "Processor and method of automatic instruction mode switching between n-bit and 2n-bit instructions by using parity check", the parity is employed to perform the switching. Each N-bit word contains two parts of P-bit parity and (N-P)-bit instruction. When a fetched 2N-bit word is of an even parity, the fetched 2N-bit word is regarded as two (N-P)-bit instructions. Conversely, when the fetched 2N-bit word is an odd parity, it is regarded as a single 2(N-P)-bit instruction.

In U.S. Pat. No. 5,758,115 granted to Nevill for an "Interoperability with multiple instruction sets", a T bit from a program counter (PC) is employed to determine an X-bit or Y-bit instruction mode performed by the processor, and an instruction of 'Branch' is used to switch the value of the T bit from the PC. in U.S. Pat. No. 6,209,079 granted to Otani, et al. for a "Processor for executing instruction codes of two different lengths and device for inputting the instruction codes", a 2N-bit word fetched by special bit recognition is two N-bit instructions or one 2N-bit instruction.

However, the prior art cannot prolong the length of data once the data structure is determined. The data for storing is necessarily aligned with a same length for easy recognition and the different lengths of data in interlacing is not allowable. Further, the density of data storage cannot be increased, and the complexity of compiler is increased. Thus, the code storage space cannot be optimized.

Therefore, it is desirable to provide an improved device and method to mitigate and/or obviate the aforementioned problems.

SUMMARY OF THE INVENTION

The object of the present invention is to provide an instruction length determination device and method using concatenate bits to determine an instruction length in a multi-mode processor.

To achieve the object, an instruction length determination device using concatenate bits to determine an instruction length in a multi-mode processor is provided. The multi-mode processor executes an m×N-bit instruction in an m×N-bit mode, where m, N are an integer greater than or equal to one. The m×N-bit instruction is formed of m N-bit data, each N-bit data having at least one concatenate bit. The instruction length determination device includes an instruction input unit, an instruction fetch unit, an instruction length determination logic and an instruction concatenate unit. The instruction input unit has a memory space to store a plurality of N-bit data. The instruction fetch unit fetches the plurality of N-bit data from the instruction input unit. The instruction length determination logic compares the concatenate bit of a first N-bit data fetched by the instruction fetch unit to a predetermined value for determination of an instruction length. The instruction concatenate unit selectively concatenates a number of successive N-bit data based on the determination of the instruction length determination logic for output.

When the concatenate bit of the first N-bit data is not equal to the predetermined value, the instruction length determination logic determines that the first N-bit data is a complete instruction and the instruction concatenate unit outputs the N-bit data, otherwise, the N-bit data is reserved and the instruction fetch unit fetches a second N-bit data. When the concatenate bit of the second N-bit data is equal to the predetermined value, the instruction length determination logic determines that the N-bit data and the second N-bit data forms a complete instruction and the instruction concatenate unit concatenates the first and second N-bit data to output, otherwise, the second N-bit data is reserved and the instruction fetch unit fetches a third N-bit data. The cited operation is continued until a last N-bit data is fetched and its concatenate bit equals to the predetermined value, which determines that a complete instruction is formed of the last N-bit data finally fetched and all N-bit previously reserved. Finally, the instruction concatenate unit concatenates the last N-bit data and all N-bit previously fetched to thereby output.

According to the instruction length determination device disclosed in a preferred embodiment of the invention, N equals to 16, and the predetermined value for the concatenate bit is set to 1'b1.

According to the instruction length determination device disclosed in a preferred embodiment of the invention, the concatenate bit locates at an assigned position in each N-bit data.

According to the instruction length determination device disclosed in a preferred embodiment of the invention, the number of concatenate bits is an integer greater than or equal to one.

According to another feature of the invention, a method for using concatenate bits to determine an instruction length in a multi-mode processor is provided. The multi-mode processor executes an m×N-bit instruction in an m×N-bit mode and has a variable length instruction set to provide different lengths of m×N-bit instructions, where m, N are an integer greater than or equal to one. Each m×N-bit instruction is formed of m N-bit data, and each N-bit data has at least one concatenate bit. The method includes the steps of: (A) fetching an N-bit data; (B) determining whether the concatenate bit of the N-bit data fetched is equal to a predetermined value, and if not, determining that the N-bit data fetched is a complete 1×N-bit instruction, otherwise, executing step (C); (C) reserving the N-bit data fetched and further fetching an N-bit data; (D) determining whether the concatenate bit of the N-bit data further fetched is equal to the predetermined value, and if not, executing step (C), otherwise, executing step (E); and (E) concatenating an N-bit data finally fetched and all the N-bit data previously reserved to form a complete m×N-bit instruction.

According to the method disclosed in a preferred embodiment of the invention, N equals to 16, and the predetermined value for the concatenate bit is set to one.

According to the method disclosed in a preferred embodiment of the invention, the concatenate bit locates at an assigned position in each N-bit data.

According to the method disclosed in a preferred embodiment of the invention, the number of concatenate bits is an integer greater than or equal to one.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
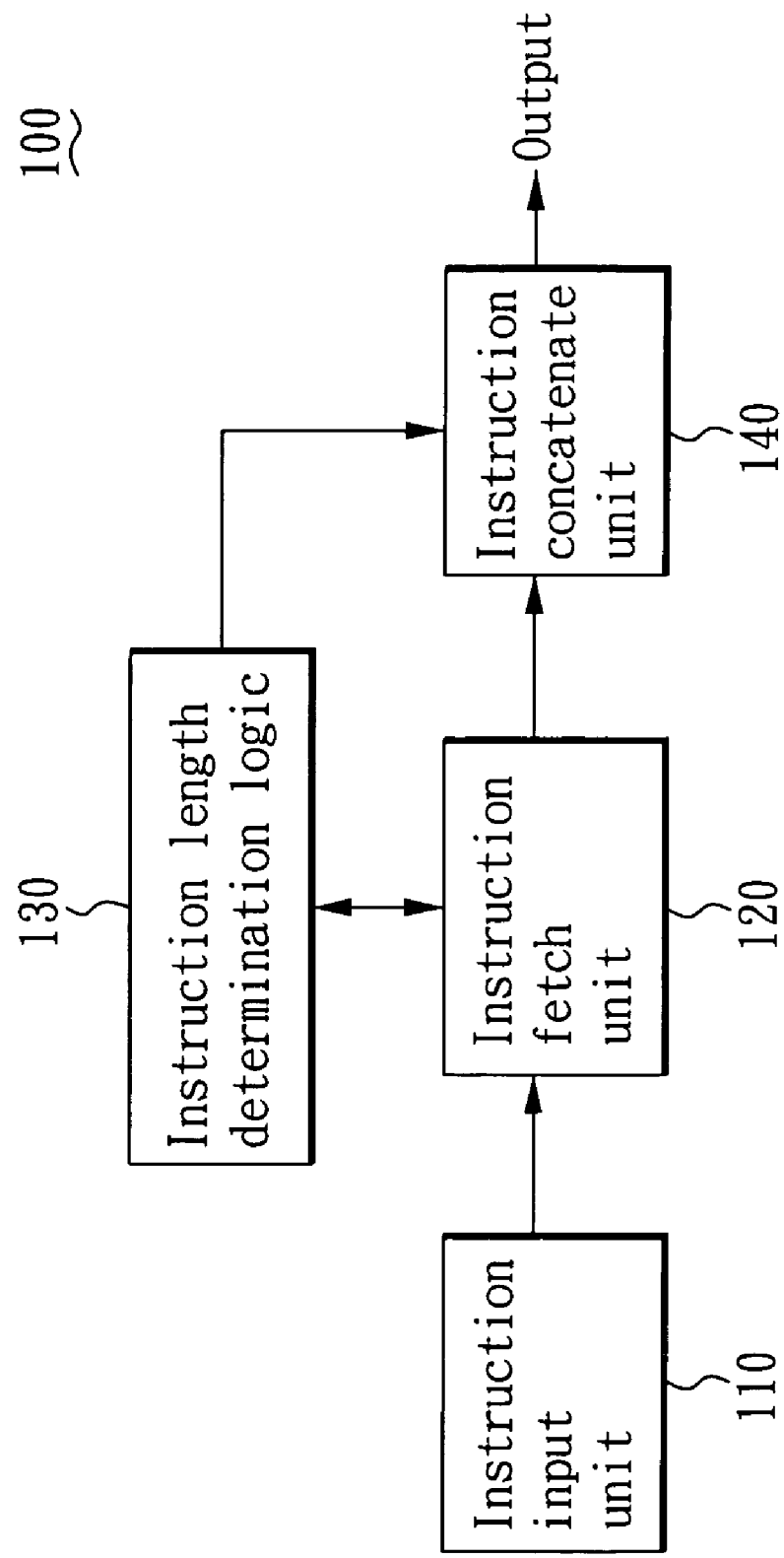
FIG. 1 is a schematic diagram of an instruction length determination device and method for using concatenate bits to determine an instruction length in a multi-mode processor according to a preferred embodiment of the invention.

FIG. 1 is a schematic diagram of an instruction length determination device and method for using concatenate bits to determine an instruction length in a multi-mode processor according to a preferred embodiment of the invention. The multi-mode processor can execute an m×N-bit instruction in an m×N-bit mode, and the m×N-bit instruction is formed of m N-bit data, where m, N are an integer greater than or equal to one. Each N-bit data has at least one concatenate bit. In this embodiment, N=16 and the width of the concatenate bit is one bit for illustrative purpose. The multi-mode processor can have multiple execution modes such as 16-bit mode (m=1), 32-bit mode (m=2), 48-bit mode (m=3), and so on. The instruction length determination device 100 includes an instruction input unit 110, an instruction fetch unit 120, an instruction length determination logic 130, and an instruction concatenate unit 140. The instruction input unit 110 has a memory space to store a plurality of 16-bit data. The instruction fetch unit 120 fetches the plurality of 16-bit data from the instruction input unit 110. The instruction length determination logic 130 compares the concatenate bit of a first 16-bit data fetched by the instruction fetch unit 120 with a predetermined value, which in this case is set to one, for determination of an instruction length. The instruction concatenate unit 140 selectively concatenates a number of successive 16-bit data based on the determination of the instruction length determination logic 130 for output.

When the instruction length determination logic 130 determines that the concatenate bit of the first 16-bit data is not equal to one, it accordingly determines that the first 16-bit data is a complete instruction. Therefore, the instruction concatenate unit 140 outputs the first 16-bit data. Otherwise, the first 16-bit data is reserved and the instruction fetch unit 120 fetches a second 16-bit data. When the instruction length determination logic 130 determines that the concatenate bit of the second 16-bit data is equal to one, it accordingly determines that the first 16-bit data and the second 16-bit data form a complete instruction. Therefore, the instruction concatenate unit 140 concatenates the first and second 16-bit data to output. Otherwise, the second 16-bit data is reserved and the instruction fetch unit 120 fetches a third 16-bit data to repeat the operations above. Such operations are continued until a last 16-bit data is fetched by the instruction fetch unit 120 and its concatenate bit equal to one is determined by the instruction length determination logic 130 to indicate that a complete instruction is formed of the last 16-bit data finally fetched and all 16-bit previously reserved. Finally, the instruction concatenate unit 140 concatenates the last 16-bit data and all 16-bit previously fetched to thereby output.

The concatenate bit can locate at any assigned position in each 16-bit data. In this case, the concatenate bit locates at the start position of the 16-bit data. In addition, the number of concatenate bits can be an integer greater than or equal to one.

Figure 2:
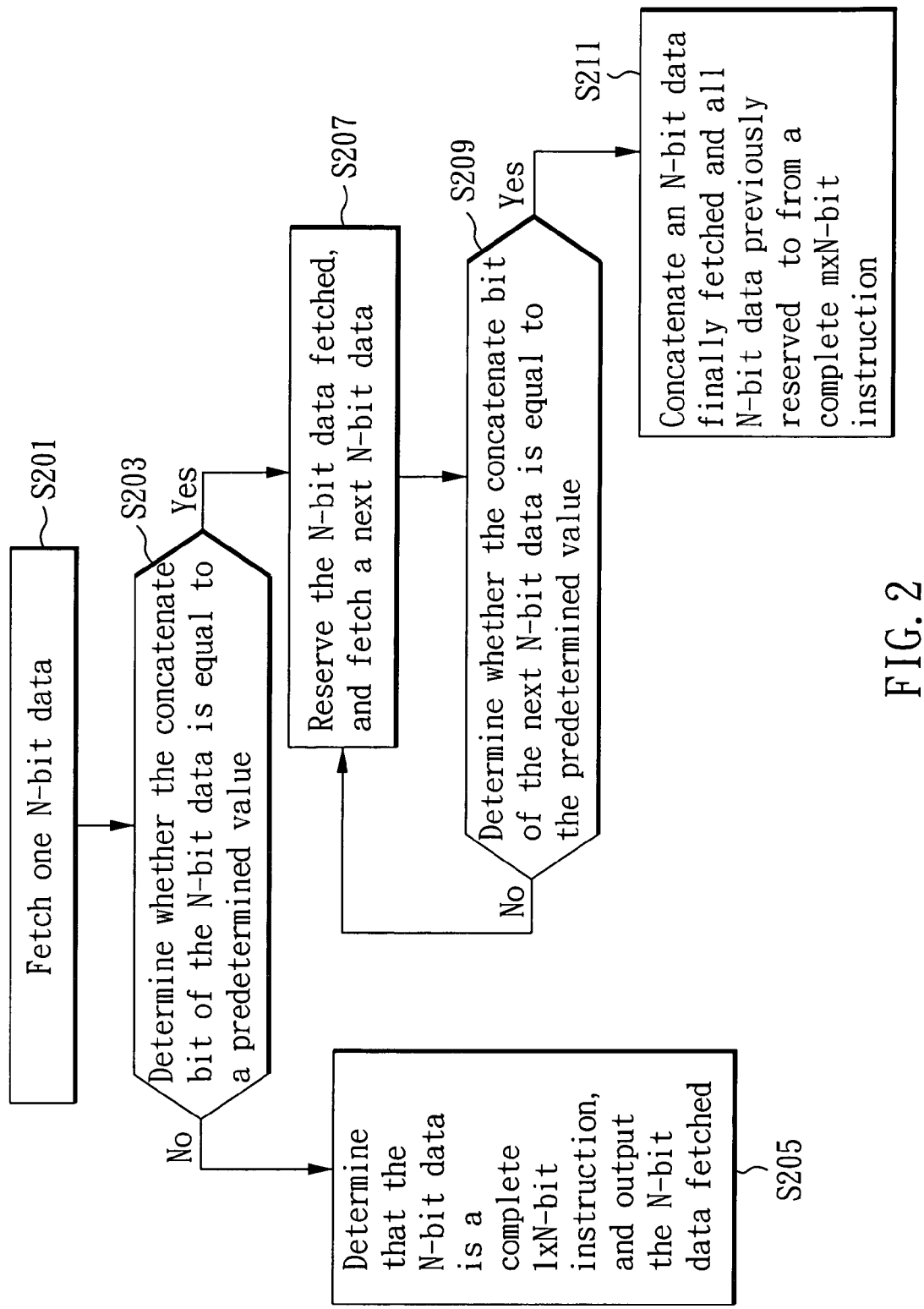
FIG. 2 is a flowchart of a method for using concatenate bits to determine an instruction length in a multi-mode processor according to a preferred embodiment of the invention.

FIG. 2 is a flowchart of a method for using concatenate bits to determine an instruction length in a multi-mode processor according to a preferred embodiment of the invention. The multi-mode processor can execute an m×N-bit instruction in an m×N-bit mode, where m, N are an integer greater than or equal to one, and has a variable length instruction set to provide different lengths of m×N-bit instructions. Each m×N-bit instruction is formed of m N-bit data, and each N-bit data has at least one concatenate bit. The number of concatenate bits is an integer greater than or equal to one.

As shown in FIG. 2, step S201 fetches an N-bit data. Step S203 determines whether the concatenate bit of the N-bit data is equal to a predetermined value. When the concatenate bit of the N-bit data is not equal to the predetermined value, it is determined that the N-bit data is a complete 1×N-bit instruction (S205). Conversely, when the concatenate bit of the N-bit data is equal to the predetermined value, the N-bit data is reserved and a next N-bit data is fetched (S207). Step S209 determines whether the concatenate bit of the next N-bit data is equal to the predetermined value. When the concatenate bit of the next N-bit data is not equal to the predetermined value, step S207 is executed. When the concatenate bit of the next N-bit data is equal to the predetermined value, step 211 determines that a last N-bit data finally fetched and all N-bit data previously reserved can be concatenated to form a complete m×N-bit instruction.

Figure 3A:
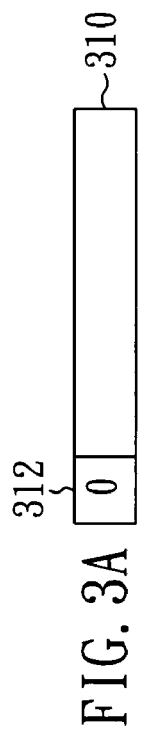
FIGS. 3A-E show an example of using concatenate bits to determine an instruction length in a multi-mode processor according to a preferred embodiment of the invention.

In this embodiment, preferably, N is 16 and the predetermined value is set to 1'b1 (value one in one bit). The following description is given with N=16, one concatenate bit and the predetermined value equal to one. Referring to FIG. 3A, a 16-bit data 310 containing one concatenate bit 312 is fetched. The concatenate bit 312 has a content of zero and locates at the start position of the 16-bit data 310. Next, the content of the concatenate bit 312 of the 16-bit data 310 is determined to be equal to the predetermined value of one or not. In this case, the content of the concatenate bit is not equal to one, and the 16-bit data 310 fetched is output, which indicates that the multi-mode processor operates in the 16-bit mode.

Figure 3B:
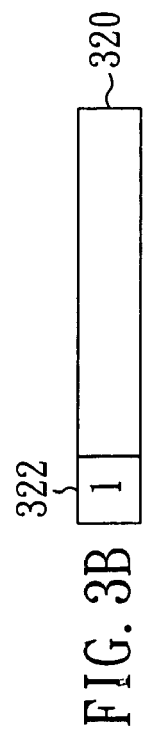
Figure 3C:
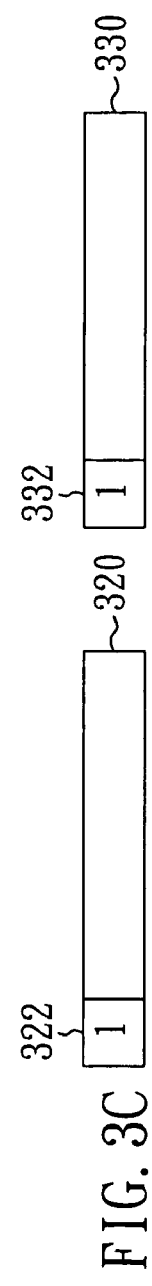

Referring to FIG. 3B, a 16-bit data 320 containing one concatenate bit 322 is fetched. The concatenate bit 322 is of one-bit width, and locates at the start position of the 16-bit data 320. Next, the content of the concatenate bit 322 of the 16-bit data 320 is determined to be equal to the predetermined value of one or not. In this case, the content of the concatenate bit is equal to one such that the 16-bit data 320 fetched is reserved and a next 16-bit data 330 is fetched, as shown in FIG. 3C. The 16-bit data 330 fetched has a concatenate bit 332. Next, it determines whether the concatenate bit 332 of the 16-bit data 330 is equal to one or not. Since in this case the concatenate bit 332 of the 16-bit data 330 is equal to one, the 16-bit data 330 currently fetched and the 16-bit data 320 previously reserved are concatenated as a 32-bit data to output, which indicates that the multi-mode processor operates in the 32-bit mode.

Figure 3D:
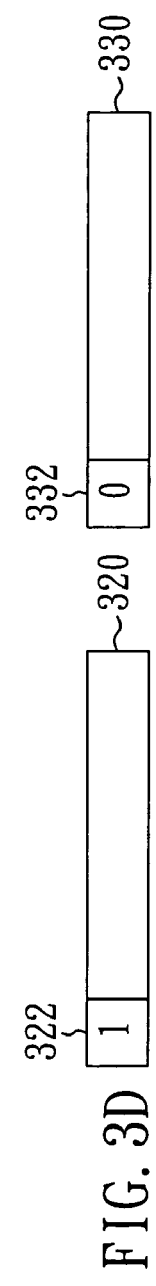
Figure 3E:
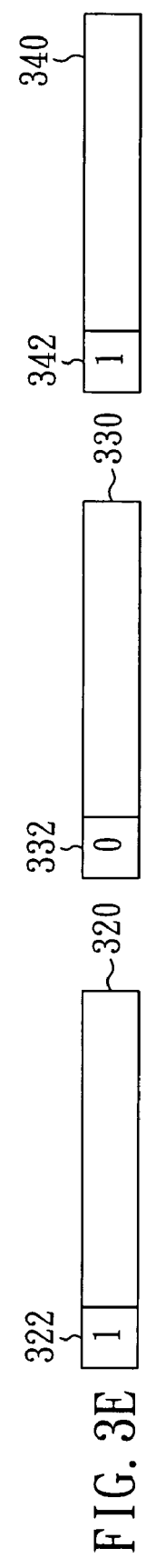

On the other hand, as shown in FIG. 3D, when the concatenate bit 332 of the 16-bit data 330 is determined not to be equal to one, i.e., the concatenate bit 332 has a content of zero, the 16-bit data 330 is reserved, and a next 16-bit data 340 is fetched, as shown in FIG. 3E. In this case, the 16-bit data 340 fetched has a concatenate bit 342 with a value of one, and it is determined that the content of the concatenate bit 342 is equal to one as same as the predetermined value. Accordingly, the 16-bit data 340 currently fetched and the 16-bit data 320, 330 previously reserved are concatenated as a 48-bit data to output, which indicates that the multi-mode processor operates in the 48-bit mode.

In this embodiment, the 16-bit width of data is given only for description, and the multi-mode processor can operate in an instruction width of 16, 32, or 48 bits. Each 16-bit data contains one concatenate bit and the 15-bit data available content. Concatenating 16-bit data forms the desired 16-, 32-, and 48-bit instructions to thereby increase the use flexibility and expansibility.

As cited, the invention can form various lengths of instruction or data by using the concatenate bits to concatenate the length-fixed data. In addition, since the concatenate bits have no repeatability. The alignment of the width of accessing lines can be eliminated to increase the density of data storage and reduce the compiler complexity. Further, since the position and length of concatenate bit are changeable, the information of the position and length of concatenate bit can be applied as a reference of data security protection in compiling and de-compiling operations.

Although the present invention has been explained in relation to its preferred embodiment, it is to be understood that many other possible modifications and variations can be made without departing from the spirit and scope of the invention as hereinafter claimed.

What is claimed is:

1. An instruction length determination device for using concatenate bits to determine an instruction length in a multi-mode processor, wherein the multi-mode processor executes an m×N-bit instruction formed of m N-bit data, each said N-bit data having at least one concatenate bit, where m, N are positive integers, the instruction length determination device comprising:

an instruction input unit, which has a memory space to store a plurality of N-bit data;

an instruction fetch unit, which fetches the plurality of N-bit data from the instruction input unit;

an instruction length determination logic, for determining an instruction length according to the concatenate bit of a first N-bit data fetched by the instruction fetch unit; and an instruction concatenate unit, which selectively concatenates a number of successive N-bit data based on the instruction length determination logic for output;

wherein, when the concatenate bit of the first N-bit data is not equal to a predetermined value, the instruction length determination logic determines that the first N-bit data is a complete instruction and the instruction concatenate unit outputs the N-bit data, otherwise, the N-bit data is reserved and the instruction fetch unit fetches a second N-bit data; when the concatenate bit of the second N-bit data is equal to the predetermined value, the instruction length determination logic determines that the first N-bit data and the second N-bit data form the complete instruction and the instruction concatenate unit concatenates the first and second N-bit data to output, otherwise, the second N-bit data is reserved and the instruction fetch unit fetches a third N-bit data until a last N-bit data is fetched and its concatenate bit equals to the predetermined value for determining that the complete instruction is formed of the last N-bit data finally fetched and all N-bit previously reserved; and the instruction concatenate unit concatenates the last N-bit data and all N-bit previously fetched for output.

2. The instruction length determination device as claimed in claim 1, wherein N=16, and the predetermined value for the concatenate bit is 1'b1.

3. The instruction length determination device as claimed in claim 1, wherein the concatenate bit locates at an assigned position in the N-bit data.

4. The instruction length determination device as claimed in claim 3, wherein the assigned position is a start position of the N-bit data.

5. The instruction length determination device as claimed in claim 1, wherein the number of concatenate bits is greater than or equal to one.

6. A method for using concatenate bits to determine an instruction length in a multi-mode processor, wherein the multi-mode processor executes an m×N-bit instruction in an m×N-bit mode and has a variable length instruction set to provide different lengths of the m×N-bit instructions, where m, N are an integer greater than or equal to one, each said m×N-bit instruction is formed of m N-bit data and each said N-bit data has at least one concatenate bit, the method comprising the steps of:

(A) fetching an N-bit data;

(B) determining whether the concatenate bit of the N-bit data fetched is equal to a predetermined value, and if not, determining that the N-bit data fetched is a complete instruction, otherwise, executing step (C);

(C) reserving the N-bit data fetched and further fetching an N-bit data;

(D) determining whether the concatenate bit of the N-bit data further fetched is equal to the predetermined value, and if not, executing step (C), otherwise, executing step (E); and (E) concatenating an N-bit data finally fetched and all the N-bit data previously reserved to form the complete instruction.

7. The method as claimed in claim 6, wherein N=16, and the predetermined value for the concatenate bit is 1'b1.

8. The method as claimed in claim 6, wherein the concatenate bit locates at an assigned position in the N-bit data.

9. The method as claimed in claim 8, wherein the assigned position is start position of the N-bit data.

10. The method as claimed in claim 6, wherein the number of concatenate bits is greater than or equal to one.

11. An instruction length determination device for using concatenate bits to determine an instruction length in a multi-mode processor, wherein the multi-mode processor executes a 16N-bit instruction in a 16N-bit mode and the 16N-bit instruction is formed of N 16-bit data, each said 16-bit data having at least one concatenate bit, where N is a positive integer, the instruction length determination device comprising:

an instruction input unit, which has a memory space to store a plurality of 16-bit data;

an instruction fetch unit, which fetches the plurality of 16-bit data from the instruction input unit;

an instruction length determination logic, which compares the concatenate bit of a first 16-bit data fetched by the instruction fetch unit with a predetermined value for determination of the instruction length; and an instruction concatenate unit, which selectively concatenates a number of successive 16-bit data based on the determination of the instruction length determination logic;

wherein, when the concatenate bit of the first 16-bit data is not equal to the predetermined value, the instruction length determination logic determines that the first 16-bit data is a complete instruction and the instruction concatenate unit outputs the 16-bit data, otherwise, the first 16-bit data is reserved and the instruction fetch unit fetches a second 16-bit data; when the concatenate bit of the second 16-bit data is equal to the predetermined value, the instruction length determination logic determines that the 16-bit data and the second 16-bit data forms the complete instruction and the instruction concatenate unit concatenates the first and second 16-bit data to output, otherwise, the second 16-bit data is reserved and the instruction fetch unit fetches a third 16-bit data until a last 16-bit data is fetched and its concatenate bit equals to the predetermined value, which determines that the complete instruction is formed of the last 16-bit data finally fetched and all 16-bit data previously reserved; and the instruction concatenate unit concatenates the last 16-bit data and all 16-bit previously fetched to thereby output.

* * * * *